United States Patent [19]

Hayden et al.

[11] Patent Number: 5,251,785

[45] Date of Patent: Oct. 12, 1993

[54] ADDITIVE INJECTION SYSTEM AND METHOD

[75] Inventors: Al P. Hayden, Norcross; Patrick L. Hayden; Chuck Miller, both of Duluth, all of Ga.

[73] Assignee: The Lubrizol Corporation, Wickliffe, Ohio

[21] Appl. No.: 832,200

[22] Filed: Feb. 6, 1992

[51] Int. Cl.$^5$ .................................... B67B 7/00
[52] U.S. Cl. ............................ 222/1; 222/16; 222/57; 222/71; 364/510; 250/356.1
[58] Field of Search ............ 222/30, 32, 36, 1, 14, 222/16, 57, 71; 250/356.1; 364/510

[56] References Cited

U.S. PATENT DOCUMENTS

| | | |
|---|---|---|
| 3,179,291 | 4/1965 | Umbach et al. |
| 3,277,918 | 10/1966 | Slade et al. |
| 3,386,620 | 6/1968 | Smith |
| 3,756,456 | 9/1973 | Georgi |
| 3,773,219 | 11/1973 | Irie et al. |
| 4,023,410 | 5/1977 | Althaus |
| 4,105,138 | 8/1978 | Lehmann et al. |
| 4,276,999 | 7/1981 | Reichenberger |
| 4,295,369 | 10/1981 | Wendelboe |
| 4,353,482 | 10/1982 | Tomlinson et al. |
| 4,397,405 | 8/1983 | Batson |
| 4,406,313 | 9/1983 | Bennett et al. |
| 4,442,953 | 4/1984 | Miyamoto et al. |
| 4,489,615 | 12/1984 | Ward |
| 4,518,101 | 5/1985 | Robinson |
| 4,568,248 | 2/1986 | Harders |
| 4,579,008 | 4/1986 | Böhm et al. |
| 4,601,409 | 7/1986 | DiRegolo |
| 4,676,403 | 5/1987 | Goudy, Jr. et al. |
| 4,679,585 | 7/1987 | Ewing |
| 4,690,163 | 9/1987 | Steinemann |
| 4,706,703 | 11/1987 | Takeuchi et al. |
| 4,719,574 | 1/1988 | Duback et al. |
| 4,754,786 | 7/1988 | Roberts |
| 4,794,947 | 1/1989 | Kuramochi |
| 4,840,292 | 6/1989 | Harvey |
| 4,911,010 | 3/1990 | Foran, Jr. et al. |
| 4,961,441 | 10/1990 | Salter |
| 4,996,888 | 3/1991 | Foran, Jr. et al. |
| 5,118,008 | 6/1992 | Williams |
| 5,124,934 | 6/1992 | Kawamoto et al. |

FOREIGN PATENT DOCUMENTS 1295896  5/1969  Fed. Rep. of Germany.
55-115111  9/1980  Japan.

OTHER PUBLICATIONS

Gate City Equipment Company, Inc., Installation Manual for GATE-PAK Additive Injector.
Gate City Equipment Company, Inc., Pamphlet Entitled: "ABC Additive Blend Controller" (1991).
Waugh Controls Corporation, Two Page Report Entitled: "Precision Metered Additive Injection" (Jun. 21, 1989).
Waugh Controls Corporation, Brochure Entitled: "Model 770 Additrol Additive Injection System".
Waugh Controls Corporation, Paper Entitled: "Operation Procedure C11300–Mobil Oil Additrol System".
Adcon Additive Controls & Measurement Systems, Collection Of Papers Relating To: "Omni-Pack Chemical Injectors" (1989).
Titan Industries, Inc., Operations/Programming Manual Entitled: "Pac-3 Programmable Additive Controller".
Waugh Controls Corporation, "Additrol-Additive Blender Model 770".

*Primary Examiner*—Gregory L. Huson
*Attorney, Agent, or Firm*—Forrest L. Collins; Frederick D. Hunter; James L. Cordek

[57] ABSTRACT

An injection system and method for blending an additive into a main fluid flow stream at a controlled ratio, characterized by a controller wherein the electrical circuitry thereof is contained in an explosion-proof housing having a window through which electromagnetic energy, such as an infrared command signal, can be transmitted. The circuitry contained within the explosion-proof housing includes a receiver for receiving the electromagnetic energy transmitted through the window and a processor or processors for decoding information included in the electromagnetic energy and for carrying out one or more functions based on such information. Also disclosed in an additive injection correction technique, a clean line technique and related and other features of the system and method.

23 Claims, 7 Drawing Sheets

ADDITIVE INJECTION SYSTEM AND METHOD

The invention herein described relates generally to an injection system and method for blending one or more additives into a main fluid flow stream at a controlled ratio.

BACKGROUND

Injection systems and methods heretofore have been devised for blending one or more additives into a main fluid flow stream according to a controlled ratio. Typical additives include fuel additives, catalysts, dyes, lubricants, water treatment chemicals, etc. and typical areas of application include gasoline truck loading terminals, marine terminals, chemical processing plants, water treatment facilities, etc.

Additive injection equipment oftentimes is located in hazardous areas such as fuel loading terminals where explosive vapors may be present. This usually requires mounting the electrical portions of the equipment inside explosive-proof enclosures. In some fuel additive injection systems, as electronic controller is contained in an explosion-proof housing. This presented a problem in that the enclosure would have to be opened to gain access to the therein contained electronic equipment in order to locally change additive rates, adjust meter factors, etc. Before opening the enclosure, rigorous care would be taken to ensure that no hazardous vapors are present, all electrical power is turned off, proper safety practices are followed, etc., and this may require the assistance of other personnel such as a certified union electrician. In another known additive injection system, an external key pad has been provided to perform operations that previously required the opening of the enclosure. However, a key pad is subject to mechanical failure especially when exposed to harsh environmental conditions that may be encountered in a fuel loading terminal or other installation.

In fuel loading terminals generic gasoline delivered by a pipeline to the terminal in many instances is sold to different gasoline marketing companies. The generic gasoline becomes the proprietary products of the different marketing companies when their particular additive is blended into the generic gasoline. Such blending typically takes place when the gasoline is being loaded into a tanker truck for further distribution. Additive injection equipment is used to blend the additive into the gasoline flow at a controlled ratio.

Additive injection systems heretofore used in fuel loading terminals have employed an additive injector including a solenoid valve to control the flow of additive through an additive flow line leading to the main fuel line through which fuel is dispensed from a storage tank to a truck being loaded. On start up of fuel flow, an external switch or automation system sends a permissive signal to the controller for the additive injector to enable the operation of additive feed at a selected ratio. Additive is cyclically injected into the main fuel line in prescribed doses at a rate determined by the rate of flow of fuel through the main fuel line. That is, for each preset quantity, such as 40 gallons (151.4 liters), of fuel that flows through the main fuel line as measured by a flow meter, a prescribed amount or dose, such as 100 cc, of additive is injected into the main fuel line. In this manner the additive is blended into the entire load of fuel at a selected ratio.

When additive is being injected, additive flow is measured by a flow meter and the additive flow control valve remains open until the dose amount has been injected. The additive flow control valve then closes stopping additive flow temporarily and until a next dose injection cycle is initiated, at which time the additive control valve is opened once again. Because it takes any solenoid valve a finite amount of time to close, a small amount of additive will flow through the control valve as it is closing. This small amount of additive should be taken into account and corrected for in subsequent injection cycles in order to obtain precise control over the total amount of additive injected into the main stream flow. According to a known correction technique, the next injection dose would be adjusted by any overage (or underage) of a preceding injection dose. That is, if "x" is the desired injection dose and the additive flow meter measured an amount of additive injected during the preceding dose as "x+a", then the amount of additive to be injected in the next cycle would be set at "x−a". In this manner, any overage would be accounted for if "a" were a positive number and any underage would be accounted for if "a" were a negative number.

Although in theory the foregoing correction technique would appear to provide for accurate correction of any overage or underage associated with the finite time required for the solenoid valve to close, the technique is subject to an accumulation of rounding errors. When the amount of overage or underage "a" is rounded to the nearest incremental amount that the system controller is capable of handling, the actual correction will deviate from the needed correction by the rounding error. For a total load of product, the accumulation of these rounding errors may give rise to a substantial variance between the amount of additive sought to be injected and the amount of additive that actually is injected during the loading operation.

A need exists in many applications for obtaining more precise control over the amount of additive injected than that afforded by the foregoing correction technique. In the case of fuel loading terminals, accurate control over the amount of additive injected into the fuel is desired to ensure the integrity of the ultimate product as well as to prevent over injection of high cost fuel additives.

SUMMARY OF THE INVENTION

The present invention provides an injection system and method for blending one or more additives into a main fluid flow stream at a controlled ratio. The system and method provide various advantages over known systems and methods, and are characterized by several unique features which may be utilized individually although preferably collectively as hereinafter described.

According to one important aspect of the invention, an additive injection system is characterized by a controller wherein the electrical circuitry thereof is contained in an explosion-proof housing having a window through which electromagnetic energy, such as an infrared command signal, can be transmitted. The circuitry contained with the explosion-proof housing includes a receiver for receiving the electromagnetic energy transmitted through the window and a processor for decoding information included in the electromagnetic energy and for carrying out one or more functions based on such information. The controller preferably has in combination therewith a portable and preferably hand held remote control transmitter for transmitting the electromagnetic energy through the window in the housing while also affording selectability of the information to be included in the electromagnetic energy by an operator of the remote control transmitter for selection and control of the functions to be carried out by the controller in response to the information included in the electromagnetic energy. This arrangement permits local control of various functions of the controller, such as testing of additive injection cycle functions including the amount of additive injected per injection cycle, the total number of test cycles to be completed and the total amount of additive injected for the total number of test cycles; changing the amount of additive injected per injection cycle for one or more additive rates; changing the additive meter factor when calibrating the meter; and resetting one or more alarms of error flags thereby eliminating the need for a separate reset switch.

According to another important aspect of the invention, precise additive injection is obtained by incrementing a reference counter after each additive injection cycle by the number of units corresponding to the next amount of additive to be injected in the next cycle. The result is a new target value for the next injection cycle which target value is the total amount of additive that was to have been injected plus the next additive dose. This technique eliminates deviations arising from the rounding errors that may occur in performing the above discussed correction technique heretofore used in the art.

According to a further important aspect of the invention, provision is made for flushing the main flow line with "clean" product, i.e., product free of additive, thereby providing a "clean line" after dispensing of a load of product, while still maintaining a predetermined ratio of additive to product. This is accomplished by inhibiting one or more injection cycles at the end of a loading operation while making up for the lost additive in earlier injection cycles by increasing the amount of additive injected in these earlier injection cycles.

According to a still another aspect of the invention, blended injection of additives into a larger flow stream may be effected in two or more stages for more precise control over the amount of additive injected during each injection cycle. Multiple stage injection is accomplished by the use of plural additive flow valves connected in parallel to the main flow line into which the additive is to be injected. During each injection cycle, the valves are open to allow a large quantity of additive to flow into the main flow line. After a predetermined percentage of the additive dose has been injected as measured by an additive flow meter, one and preferably a larger one of the valves is closed so that additive flow continues only through the other valve or valves at a slower and preferably much slower rate. Accordingly, additive flow can continue for the remainder of the injection cycle but at a more controllable rate. If more than two valves are employed, they may be closed in sequence to progressively slow the rate of additive flow.

According to yet another aspect of the invention, an additive injection system comprises a housing for electrical circuitry of an additive injection controller, and a flow meter having a housing directly mounted to the controller housing. The flow meter includes a flow chamber through which additive flows to effect rotation of a drive magnet at a speed proportional to the rate of additive flow through the meter. The drive magnet is magnetically coupled to a driven magnet through a wall of the flow meter housing which wall forms a fluid isolation barrier between the coupled magnets. The driven magnet is mounted to a shaft which extends through the wall of the controller housing and has connected to its inner end an indicator, such as an optic disk, which is located within the controller housing. Also located in the controller housing is electrical circuitry responsive to the indicator for generating periodic signals at a rate proportional to the rotational speed of the indicator and, consequently, at a rate proportional to the rate of additive flow through the meter.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
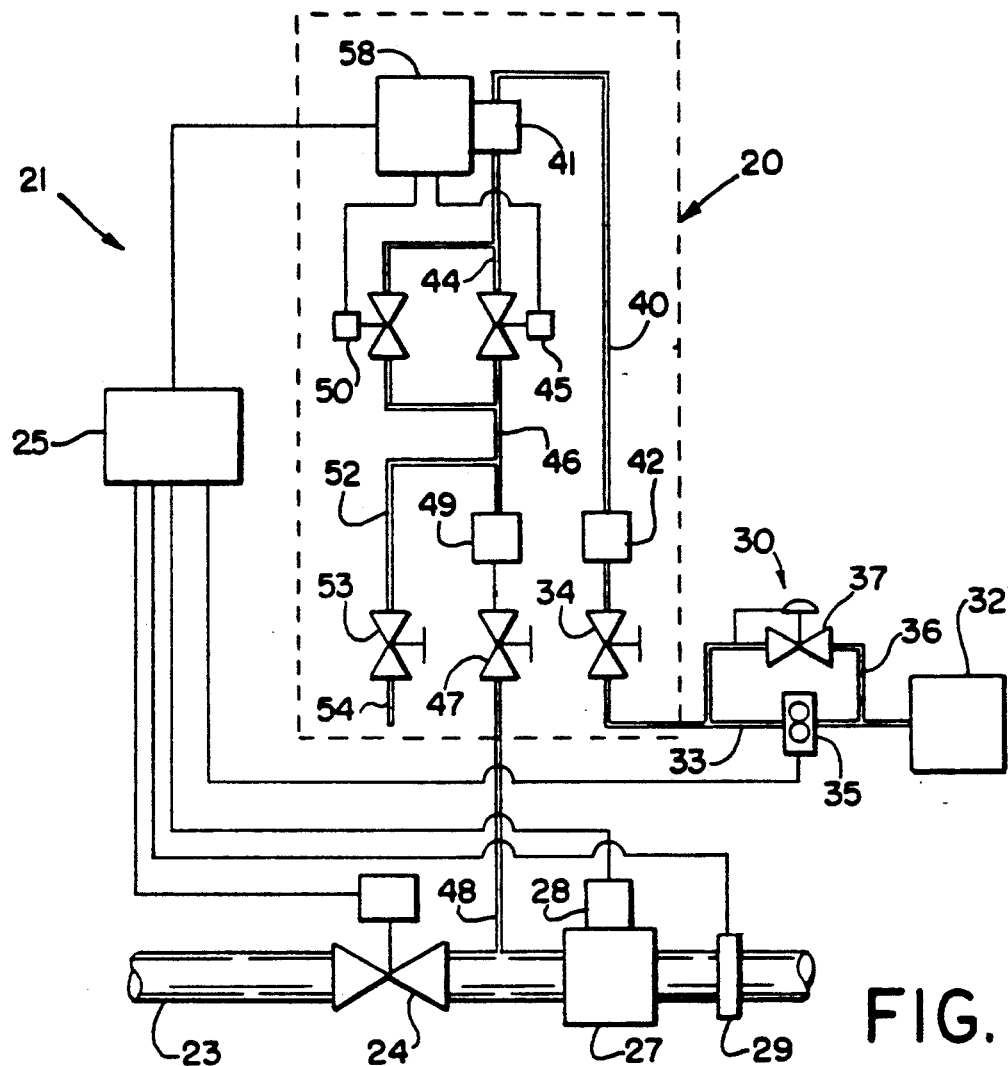
FIG. 1 is a schematic illustration of an additive injection system according to the invention.

Referring now in detail to the drawings and initially to FIG. 1, a preferred embodiment of an additive injection system according to the invention is indicated generally at 20. The system functions to inject an additive at a selected ratio into a main fluid flow stream. In FIG. 1 the additive injection system 20 is shown integrated into an otherwise conventional system that may be employed, for example, at a fuel loading terminal for injecting a fuel additive into a fuel such as gasoline, as for converting "generic" gasoline to a proprietary "branded" gasoline product being loaded into a truck for distribution.

Although the following description of the invention will be primarily made with regard to this particular and exemplary application of the invention, it should be understood that the invention has a wider range of application and is not limited to injection of a fuel additive into a fuel such as gasoline. That is, the following references to fuel additive could be more generally made to any additive and the following references to fuel could more generally be made to any main fluid into which an additive is to be blended by cyclical injection.

In FIG. 1 the overall system 21 can be seen to comprise a fuel line 23 through which fuel from a storage tank may be dispensed for loading into a tanker truck. The flow of fuel through fuel line 23 is controlled by a typically motor driven, main flow control valve 24, opening and closing of which is controlled by a main system controller 25. The main system controller 25 includes an operator interface whereby an operator may select a desired quantity of fuel to be loaded into the tanker truck. Fuel flow through the fuel line 23 is measured by a main flow stream meter 27 which has associated therewith a pulser 28 that produces a digital pulse output with each pulse representing a discrete increment or quantity of fuel. Accordingly, the number of pulses outputted by the pulser 28 may be totalized to obtain a representation of the amount of fuel that has flowed through the meter 27. Also provided is a fuel flow switch 29 for detecting the existence of flow in the fuel line. Whenever fuel flow exists, the pulser should be outputting pulses and the fuel flow switch should be activated.

Upon initiation of a loading sequence, a desired amount of fuel to be loaded is selected. Fuel loading is then commenced by opening main flow control valve 24 whereupon fuel will flow through fuel line 23. As a result of this flow, the pulser 28 will produce a train of pulses proportional to volumetric fluid flow through the meter 27. When the desired quantity of fuel has been dispensed (as determined by comparing the total number of pulses accumulated to a predetermined number of pulses representative of the volume of fluid to be dispensed), the system controller 25 will close the main flow control valve 24. In most fuel loading terminals where high rates of fuel flow are encountered in the fuel line, the main system controller typically issues a low flow switch signal that activates a low flow switch for initiating slow closure of the valve 24 as when, for example, 50 gallons (189.3 liters) of fuel remain to be dispensed to complete the load. This slow closure of the valve avoids abrupt stopping of fuel flow which could damage the system and also provides for more accurate control over the amount of fuel that is dispensed into the tanker truck.

The main system controller 25 also controls apparatus 30 for supplying additive to the additive injection system 20. The additive supply apparatus 30 includes an additive storage tank 32 connected by an additive supply line 33 to a hand-operated inlet isolation valve 34 of the additive injection system 20. An additive supply pump 35 is connected in the additive supply line 33 and a bypass line 36 and pressure regulating valve 37 are connected across the pump 35 to provide a pressure regulating bypass around the pump which shunts flow back to the pump inlet when flow through the additive injection system is blocked by the inlet isolation valve 34 or control valves provided in the additive injection system.

The additive injection system 20 includes the above-mentioned inlet isolation valve 34 which may be manually closed to isolate the additive injection system from the additive supply apparatus 30. The inlet isolation valve is connected via line 40 to the inlet of an additive flow meter 41 which is described in greater detail below. The line 40 preferably is provided with an inlet strainer 42, as is conventional and good engineering practice.

The outlet of the additive flow meter 41 is connected via flow line 44 to a first stage flow control valve 45 which is solenoid-operated. The first stage flow control valve 45 is in turn connected via flow line 46 to a hand-operated outlet isolation valve 47 to which an additive discharge line 48 is connected. The additive discharge line 48 extends to the fuel line 23 for injection of additive into the fuel line. The outlet isolation valve 47 may be manually closed to isolate the additive injection system from the additive discharge line 48 and hence from the fuel line 23. Preferably a check valve 49 is provided in flow line 46, as is conventional and good engineering practice.

In the illustrated embodiment, a second stage additive flow control valve 50 is connected across the lines 44 and 46 in parallel with the first stage additive flow control valve 45. For reasons that will become more apparent below, the second stage valve 50 has a higher capacity than the first stage valve, thereby to establish a high additive flow rate when both control valves are open and a substantially reduced additive flow rate when the second stage valve is closed while the first stage valve remains open.

The additive injection system 20 also includes a branch flow line 52 connected to a manually operated test valve 53. The test valve 53 preferably is conveniently located and has an outlet 54 that is conveniently accessible to facilitate positioning therebeneath of a calibration gauge into which additive may be injected for purposes of calibrating the additive injection system 20.

The additive injection system 20 further comprises an additive injection controller 58 which, among other things, controls the first and second stage additive control valves 45 and 50. The controller 58 is a programmed microprocessor based device, the circuitry and operation of which is hereinafter described.

Figure 3:
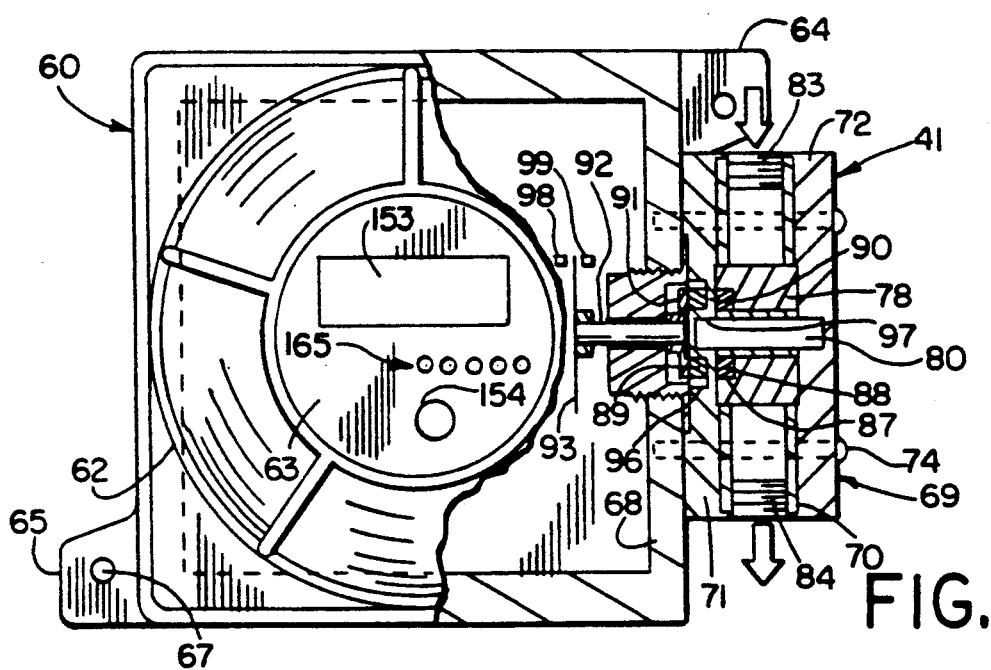
FIG. 3 is an elevational view, partly broken away in section, of the housing and meter assembly shown in FIG. 2.
Figure 2:
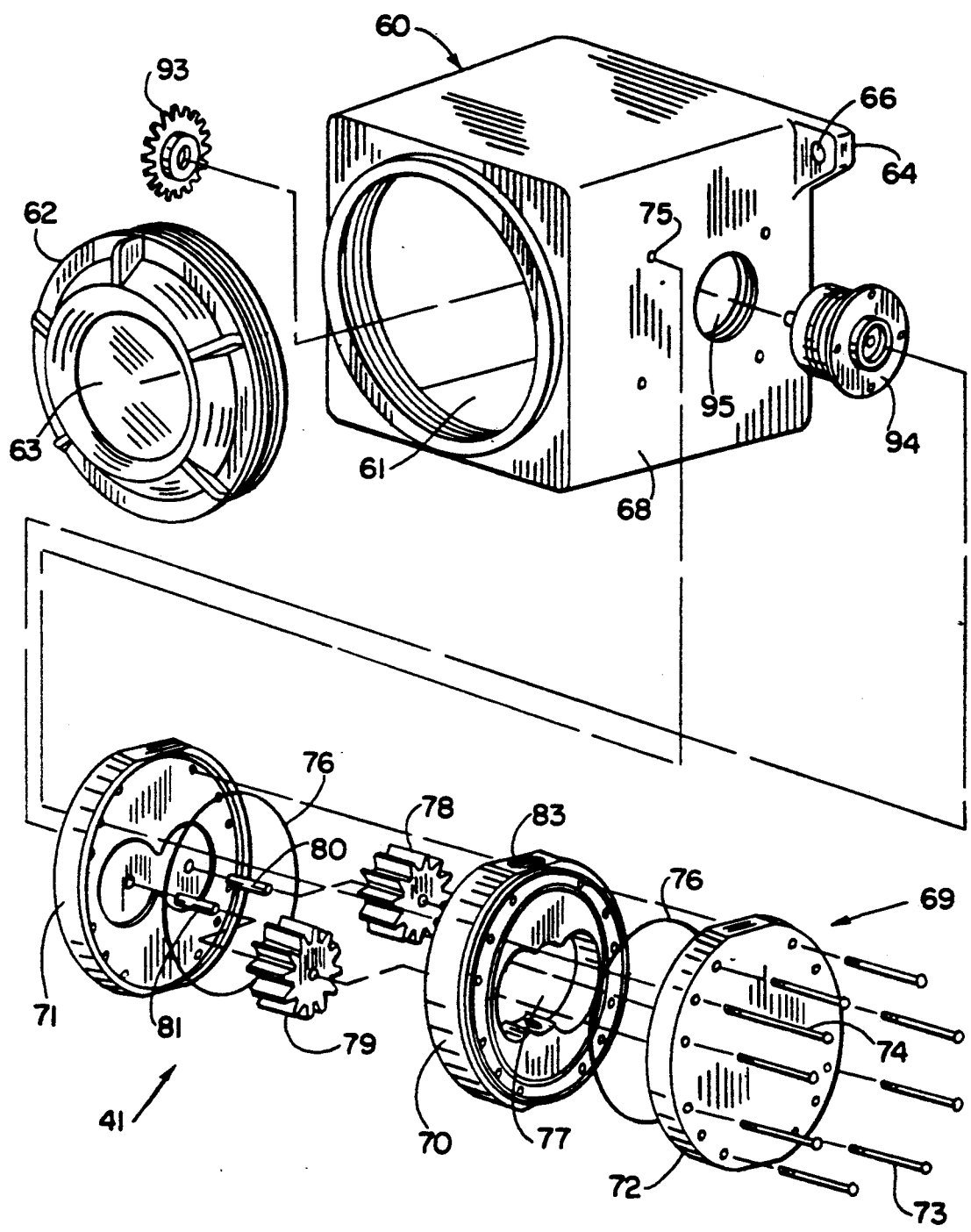
FIG. 2 is an exploded perspective view of the system's controller housing and additive flow meter assembly.

Referring now to FIGS. 2 and 3, the electrical circuitry of the additive injection controller 58 is contained within an explosion proof housing 60. The housing 60 has a large circular front access opening 61 which is closed by an explosion proof cover 62. The opening 61 and cover 62 are respectively internally and externally threaded whereby the cover 62 may be screwed into and out of the housing. The cover 62 has a circular transparent window 63 for permitting viewing of visual display elements of the additive injection controller. The window 63 also allows an electromagnetic energy communication link to be established between the controller circuitry located inside the housing 60 and a hand held remote control transmitter, the purpose of which is hereinafter described. The housing 60 is further provided with mounting ears 64 and 65 including bolt holes 66 and 67 for permitting easy mounting to a suitable support structure such as a back panel to which the other components of the additive injection system may be mounted, as is industry custom.

The additive flow meter 41 is directly mounted to a side wall 68 of the controller housing 60. The additive flow 41 meter has a meter housing 69 formed by a center body 70 which is sandwiched between an inside cover 71 and an outside cover 72. The center body 70 and the covers 71 and 72 are secured together by a plurality of mounting screws 73. Other mounting screws 74 extended through and beyond the meter housing for threaded receipt in closed ended holes 75 in the housing side wall 68 for mounting the meter housing to the controller housing 60. O-ring seals 76 are provided between the center body and the covers to seal against leakage from a gear meter displacement chamber 77 formed interiorly of the center body and covers.

A pair of rotors or gears 78 and 79 are disposed in respective lobes of the displacement chamber 77. The gears 78 and 79 are mounted for rotation on respective gear shafts 80 and 81 which are supported by and between the inside and outside covers 71 and 72. The gears closely fit within the respective lobes of the displacement chamber and the lobes or teeth thereof are in mesh. The shafts may be provided with bushings as shown.

The center body 70 has at diametrically opposite ends thereof an inlet passage 83 and an outlet passage 84 for flow of additive into and out of the gear motor displacement chamber 77. The inlet and outlet passages connect to the chamber 77 at diametrically opposite ends of a center lobe of the chamber which is formed only in the center body and symmetrically intersects the end lobes in which the gears 78 and 79 are disposed. As additive flows from the inlet passage through the chamber 77 and out through the outlet passage, the rotors will turn at a rate directly related to the rate of fuel flow through the meter.

As best seen in FIG. 3, the gear 78 has in its inner side a recess 87 in which a drive magnet 88 is fixed for rotation with the gear. The drive magnet is a circular disk or donut which is mounted in the recess 87 concentric with the rotational axis of the gear and preferably with its outer surface flush with the inner side surface of the gear 78 as shown. The drive magnet 88 is magnetically coupled to a driver or follower magnet 89 through a reduced thickness wall portion 90 of the inside cover 71. The inside cover 71, at least in the region of the reduced thickness wall portion 90, is made of a nonferromagnetic material to allow for such magnetic coupling. Preferably, all of the meter components at least in the region of the drive and driven magnets are made of a nonferromagnetic material.

The driven magnet 89 is mounted at its axial side opposite the drive magnet 88 to a hub 91. The hub is mounted to the axially outer end of an optic drive shaft 92 to which an optic disk 93 is attached interiorly of the controller housing 60. The optic drive shaft is mounted for rotation coaxially with the gear shaft 80 in a plug member 94 which has an externally threaded cylindrical portion threaded into a threaded opening 95 in the side wall 68 of the controller housing 60. A bushing for the optic drive shaft may be provided in the plug member as shown.

The driven magnet 89 preferably is accommodated in an annular groove or recess 96 provided in the outer surface of the inside cover 71, with the reduced thickness portion 90 of the inside cover being provided at the bottom of the annular recess 96. This allows the magnet to be brought into close proximity and under the magnetic influence of the drive magnet 88 while the reduced thickness portion of the inside cover provides an integral seal against any passage of additive into the interior of the controller housing 60. That is, the prevention of flow of additive into the housing is prevented by means other than a conventional seal or seals, i.e., by a continuous metal interface between the interior of the controller housing and the gear meter displacement chamber 77.

The annular recess 96 in the inside cover 71 surrounds a cup-shape core portion 97 of the inside cover which includes an inwardly opening hole for supporting therein the inside end of the gear shaft 80. As shown, the ends of each gear shaft 80, 81 are supported in holes in the covers that are closed ended to avoid the need for additional seals. The driven magnet, which has a disk or donut shape, is slipped over the core portion 92 and has a center hole sized to permit free rotation of the driven magnet relative to the core portion 92.

As will appreciated, flow of additive through the meter 41 will cause the meter gears 78 and 79 to rotate at a speed determined by the rate of additive flow. This rotation in turn will rotate the optic disk 93 at the same speed. The optic disk is intended to function as a flow rate indication and is provided with a plurality of slots at its perimeter for interrupting an optic beam between a light emitting diode 98 and detector 99 which are schematically shown in FIG. 3 and which may be mounted in any convenient manner inside the controller housing 60 such as to the back wall of the housing. The detector will output a stream of pulses proportionally related to the rotational speed of the optic disk which in turn is proportional to the rate of flow of additive through the additive flow meter. This train of digital pulses is inputted into the circuitry of the additive injection controller 58 which will now be described.

CONTROLLER CIRCUITRY

Figure 4:
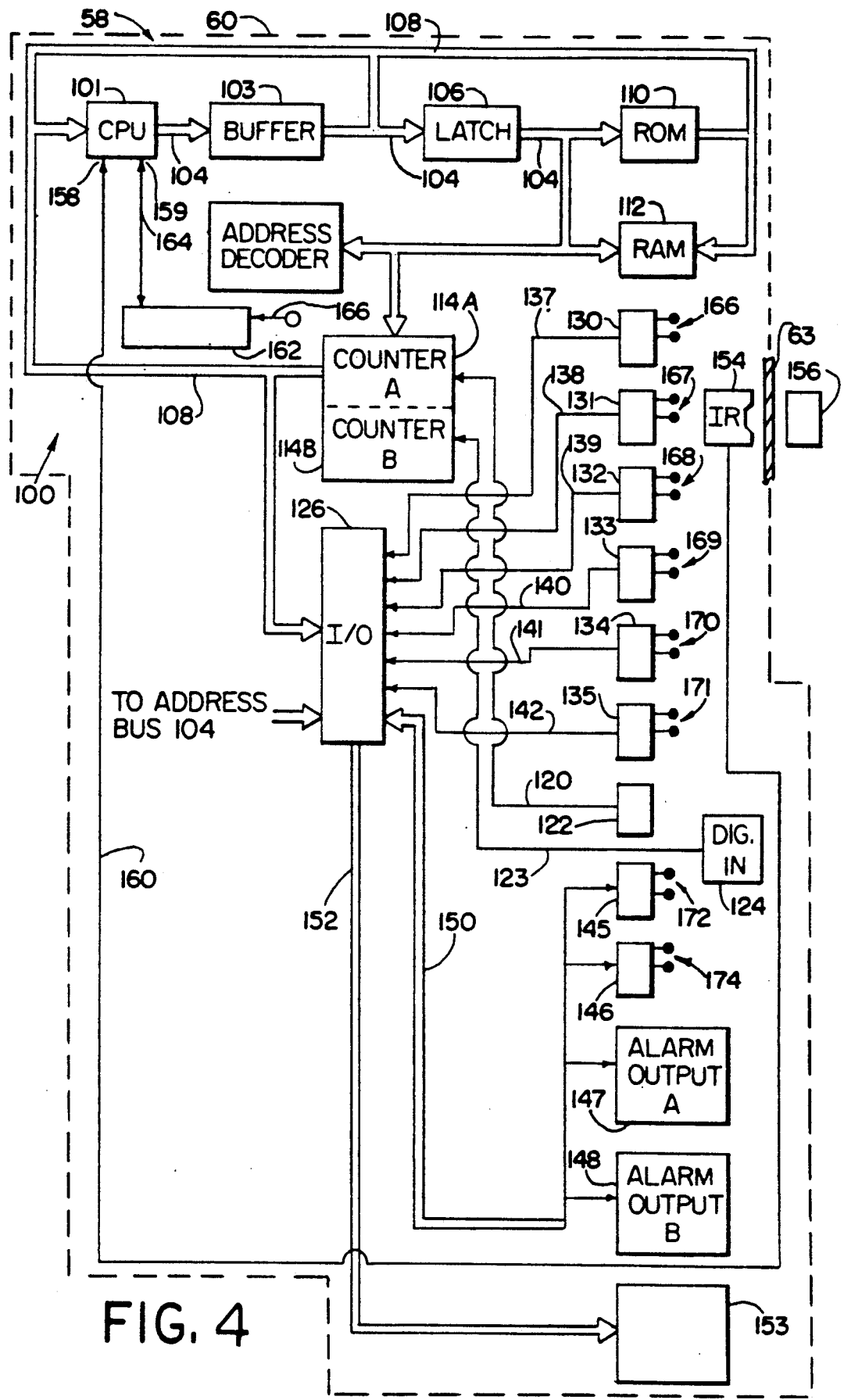
FIG. 4 is a block diagram of the controller circuitry employed in the system of FIG. 1.

Referring now to FIG. 4, a block diagram of the circuitry of the additive injection controller 58 according to a preferred embodiment of the invention is indicated generally at 100. The controller 58, or more particularly the circuitry 100 thereof, includes a microcontroller 101 which provides the desired system control referred to above and described in more detail below with respect to the flow diagrams shown in FIGS. 5-9. The microcontroller 101 can be, for example, an 80C32 microcontroller which is commercially available from Intel Corporation. The microcontroller 100 can be programmed by one having ordinary skill in the art using conventional programming techniques to provide the system control described herein as will be appreciated.

The controller 58 further includes a buffer 103 for buffering the address information from the microcontroller 101 on the address bus 104. The output of the buffer 103 is coupled via the address bus 104 to the input of latch 106 as is shown. Latch 106 serves as a multiplexer and is used to latch information from either the address bus 104 or the data bus 108 to the memory address inputs as is conventional. More specifically, the address information at the output of latch 106 is coupled alon address bus 104 to the read-only-memory (ROM) 110 and the random-access memory (RAM) 112 address inputs as is shown. The ROM 110 is provided for storing the operating code for the microcontroller 101 and the RAM 112 is used to store the system program along with any other desired data/information as will be appreciated. Data is transferred to and/or from the memory 110 and 112 by way of the data bus 108.

The controller 58 also includes a pair of counters 114A and 114B for counting, respectively, the number of pulses provided by the additive flow meter 41 and the pulser 28 of the fuel flow meter 27. In the preferred embodiment, the counters 114A and 114B are addressable via the address bus 104 and provide count information regarding the number of such pulses to the microcontroller 101 via the data bus 108. The input of counter 114A is connected by way if line 120 to the additive flow meter input device 122, which in the illustrated embodiment is the detector 99. Similarly, the input of counter 114B is coupled by way of line 123 to a digital input device 124 which provides the digital signal from the fuel flow meter 27. The counters may be an 82C54 package.

An I/O device 126, such as an 8255 DEVICE which is commercially available from Intel, provides a number of input/output ports for use by the controller 58. More particularly, the I/O device 126 is connected to the address bus 104 and the data bus 108 as shown and is used to transfer information received by the different input coupling devices 130-135 to the microcontroller 101. The input coupling devices 130-135 are preferably optically isolated for receiving 110 VAC inputs and serve to couple the data and/or control inputs from the various system components such as the system reset switch, clean start switch, etc., to the microcontroller 100. The input coupling devices are connected to the I/O device 126 by way of lines 137-142 as is shown. In addition, output coupling devices 145-148 are connected to the I/O device 126 by way of an output bus 150 and can be accessed by the microcontroller 101 to control various system functions such as opening and closing the respective valves, etc., as described in detail below. Also connected to the I/O device 126 by way of bus 152 is a display 153 for displaying pertinent system information. Such information can include, for example, a status display, error messages, additive ratio settings, etc.

The photodetector 154 which receives the infrared signal from the remote control transmitter 156 is connected to a serial data input 158 of the microcontroller 101 by way of line 160. Based on the information received at the input 158, the microcontroller 101 invokes the system program to produce the desired results in accordance with the flow diagrams presented in FIGS. 5-9. The remote control transmitter 156 preferably is a hand held unit that may be similar in type and operation to a conventional remote control transmitter used to operate a television. Such transmitter typically transmit, upon pressing a key, a single character sequence which is received and interpreted by the receiving equipment, in the present case the controller 58. Of course, the keypad on the transmitter preferably is configured and labeled to facilitate selection of commands and entry of data applicable to the intended application, in this case an additive injection controller.

In the preferred embodiment, the additive injection controller 58 also includes a serial data receiver 162 such as the commercially available MAX232 RS-232 receiver from Maxor. The serial data receiver 162 enables serial data communications between the controller and the main system controller 25 or other computer or device. The receiver 162 is connected via line 164 to the serial data input 159 of the microcontroller 101. The receiver 162 includes a serial data input 166 which allows a user to input information to the microcontroller 101 without the use of the remote control transmitter 156. Preferably, inputs 158 and 159 are physically the same input. Information received from the detector 154 and the receiver 162 is simply multiplexed at the input 158 by way of an OR gate or the like. Otherwise, a second serial input to the microcontroller may be used as will be appreciated. Moreover, those having ordinary skill in the art will appreciate that although the invention is described as receiving primarily serial data at its inputs, other data formats, i.e., parallel data, will perform equally as well.

As seen in FIG. 3, the detector 154 is positioned to receive the infrared signal through the window 63. Of course, the window 63 should be transparent to the frequency of the infrared signal or other electromagnetic energy that may be used. As also seen in FIG. 3, the display 153 can be viewed through the housing window 63, as may one or more optional status lights indicated at 165. The status lights may be included in the controller circuitry to indicate the status of one or more functions of the controller, such as first stage valve state, second stage valve state, etc.

Describing briefly the different inputs and outputs provided to the coupling devices 130-135 in the controller 58, input coupling device 130 receives at its input terminals 166 a control signal used to communicate to the microcontroller 101 that the system is to be in a permissive A state. Similarly, input coupling devices 131 and 132 receive at their respective input terminals 167 and 168 control signals which are utilized to communicate to the microcontroller 100 that the system is to be in a permissive B or permissive C state, respectively. Input coupling device 133 receives at its input terminals 169 a control signal from the fuel flow switch 29 that indicates to the microcontroller 101 fuel is flowing in the fuel line 23. Thus, in the event that the microcontroller 101 receives a control signal from the fuel flow switch indicating that fuel is flowing in the main fuel line 23 but does not receive a signal at the digital input 124, the microcontroller 101 may detect a failure state and take a predetermined course of action. For example, the controller 58 may issue an alarm and/or error message, as described below.

The input coupling device 134 is used to couple a system reset request to the controller 58 by way of providing a control signal to the microcontroller 101 instructing the microcontroller to reset the system in a predetermined manner, i.e., by resetting the counters, shutting the valves, etc. Such reset request can be received at the input terminals 170 of the device 134. Input coupling device 135 is used to couple a low flow control signal at its input terminals 171 to the microcontroller 101 which control signal indicates that fuel loading is being switched to its low flow stage near the end of the load as when about 50 to 60 gallons (189.3 to 227.1 liters) of fuel remain to be loaded.

Preferably, the above-described input devices 130-135 are optical isolator triac devices which receive an alternating current (AC) input signal at their respective input terminals. The input signal is then optically isolated and rectified to provide a secondary input signal on lines 137-142 consisting of a "low" or "high" digital signal depending, of course, on whether the AC input signal is present or not.

The output coupling devices in the exemplary embodiment include the first stage inject coupling device 145 for coupling a control signal from the microcontroller 101 to the first stage inject control solenoid valve 45 by way of terminals 172. Output coupling device 146 couples a control signal from the microcontroller 101 to terminals 174 which in turn are connected to the second stage inject control solenoid valve 50 for controlling the position of such valve. In the event of a failure, error or anomaly being determined by the system program, the microcontroller 101 can activate either one or both of output devices 147 and 148 which, in the preferred embodiment, represent an A and B alarm output identifiable with different types of failure modes as is described below.

SEQUENCE CONTROL

FIGS. 5-9 are flow diagrams of the program routines that control the functions of the additive injection controller 58. The sequences of the programs will now be described starting with the main program routine.

Figure 5:
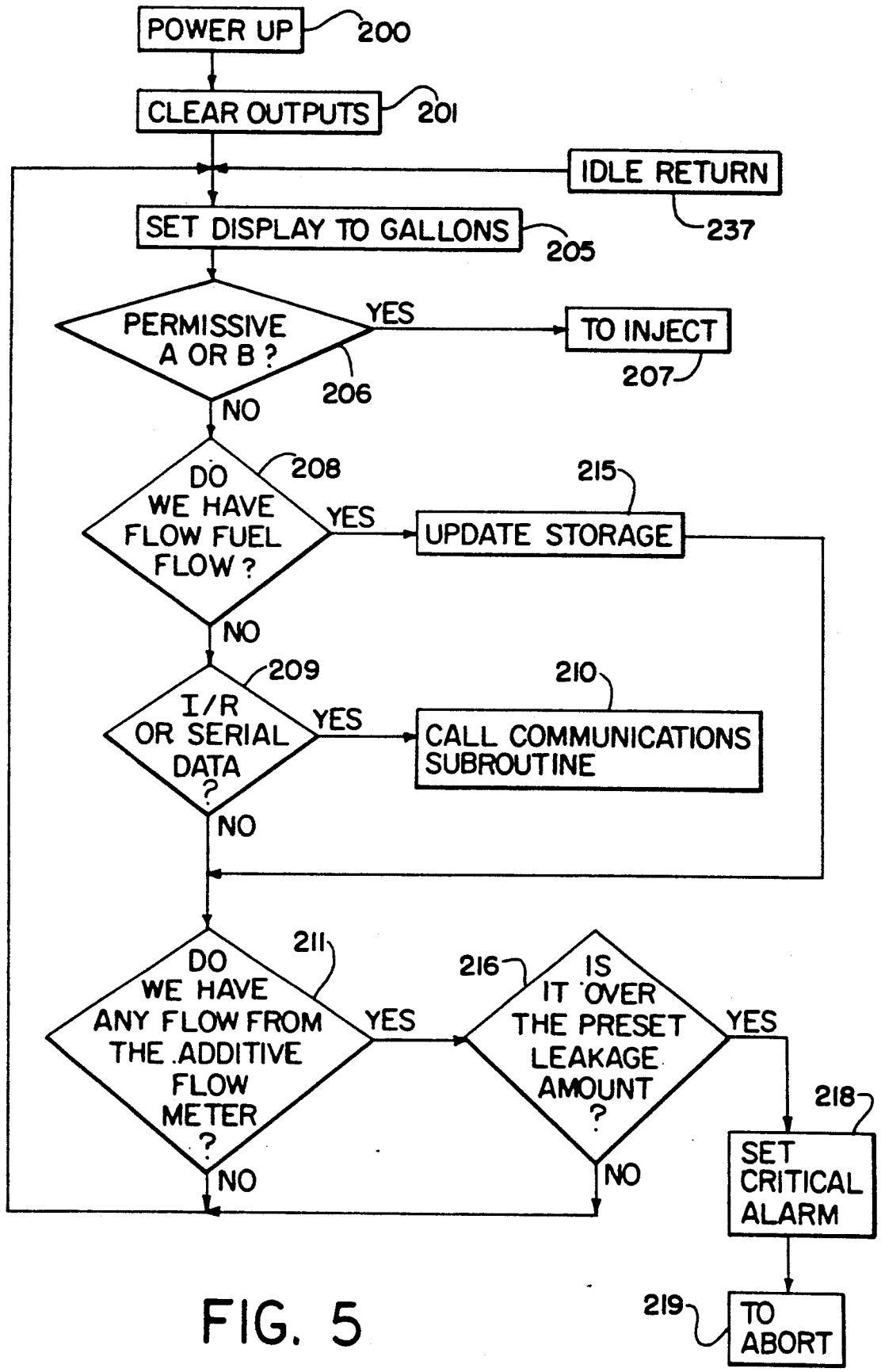
FIGS. 5-9 are flow charts illustrating the operation of the controller.

Referring to FIG. 5, the main program routine starts on power-up at step 200. Upon power-up, an logic reset signals required by the microprocessor or any other logic circuitry are generated to reset all chips within the controller circuit. Also, at step 201, the controller outputs are cleared, i.e., set to 0 or otherwise initialized.

Having been initialized and the outputs cleared, the controller enters as input scan loop starting at step 205 which sets the controller display to show the total amount of additive flow in a convenient unit such as, for example, gallons or liters. Next, at step 206, the controller checks for a permissive A or B input. If a permissive A or B input exists, thereby calling for injection of additive, the controller executes at step 207 an inject routine which is hereinafter described and illustrated in FIGS. 6 and 7. Otherwise, the controller moves to step 208 at which a check is made to see if there is fuel flow. If the fuel flow counter is not being incremented by receipt of signals at its input, the controller proceeds to step 209 to check for receipt of any infrared (I/R) or serial data at the respective inputs therefor. If data at either of the infrared or serial inputs is detected, then the controller executes at step 210 a communications subroutine which is hereinafter described and shown in FIG. 9. Otherwise, the controller moves to step 211 to check for additive flow.

Returning to step 208, if the controller detects fuel flow, the value of total fuel flow stored in system memory is updated at step 215. In this manner the controller keeps track of total fuel flow through the fuel line, even when additive is not being injected by the additive injection system 20. After the stored value of fuel flow is updated, the controller moves to step 211 bypassing the check for infrared or serial data. This prevents the system values or procedures from being changed or reset while fuel is flowing through the main fuel line.

At step 211, the controller checks to see if there is additive flow, i.e., if the additive counter is being incremented by receipt of signals at the additive flow input. If no additive flow is detected as should normally be the case, program flow loops back to step 205. If, however, additive flow is detected, a check is made at step 216 to see if the flow exceeds a preset leakage amount that may be tolerated. If additive flow does not exceed the preset leakage amount, program flow loops back to step 205. Otherwise, a critical alarm is set at step 218 and the controller proceeds to step 219 at which an abort routine is executed to issue appropriate alarm signals and inhibit further fuel and additive operations. The controller may display, for example, an alarm message on the controller display 153 [FIG. 3], and further may transmit a critical alarm signal to the main terminal process controller 25 [FIG. 1]. Also, the type of alarm and the time and date of its occurrence preferably is stored in controller memory which has a battery backup as above described. This allows system operators to monitor and analyze the operation of the controller.

Figure 6:
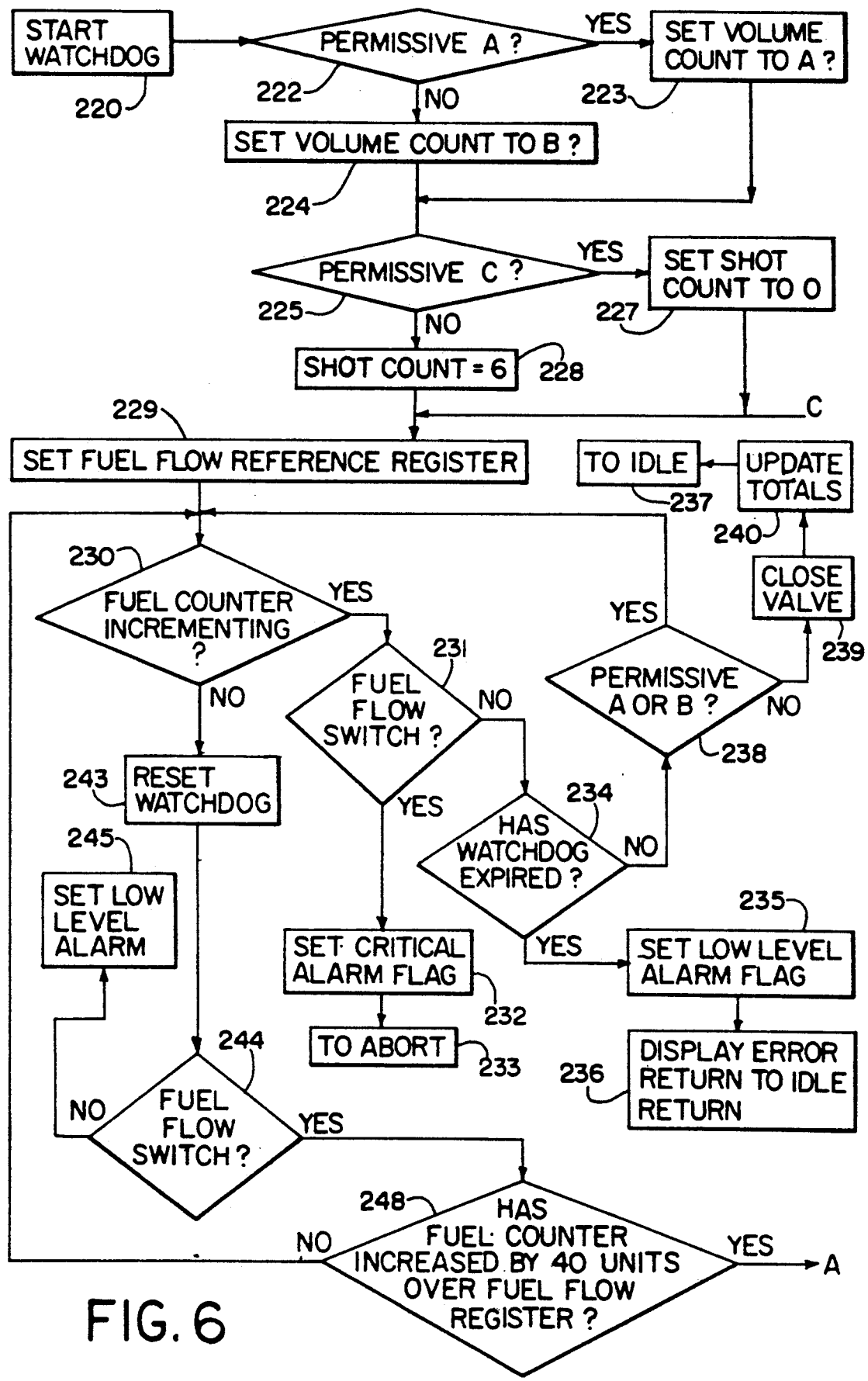

Referring now to FIG. 6, the inject subroutine can be seen to start at step 220 where a watchdog timer is set. Preferably, a hardware circuit in the above identified microcontroller is used to perform the timer function in background so that the time runs in real time. When the watchdog timer times out, a hardware interrupt is generated to set a flag to the controller that the set timer period has expired. Checks may be made as discussed hereinafter to determine whether or not the watchdog timer has timed out.

The watchdog timer set at 220 sets a maximum time period between receipt of a permissive A or B signal and the commencement of fuel flow. If fuel flow does not start in the allotted time, then the permissive signal is ignored and an alarm is set as further discussed below.

After the watchdog timer has been set at step 220, a determination is made at step 222 to see which permissive signal exists. If a permissive A signal exists, a dose value is set at step 223 to value "A" which corresponds to the additive dose for permissive A to be injected during each injection cycle. If a permissive B signal exists, the dose value is set at step 224 to the value "B" which corresponds to the permissive B additive dose to be injected during each inject cycle. After the dose value has been set to the instructed value, the controller proceeds to step 225 to check if a permissive C signal exists. If a permissive C signal exists, a shot count is set at 0 at step 277. Otherwise, the shot count is set at 6 at step 228.

In the illustrated embodiment, the controller is programmed to respond to a permissive C input as an instruction to effect a clean start whereby additive flow is disabled at the end of the loading operation so that "clean" fuel, i.e., fuel with no additive, will be flushed through the fuel line so that the next load will not be "contaminated" with the additive injected during the previous loading operation. The following description will first be described as if no permissive C signal has been received and then as if a permissive C signal had been received. Before proceeding, it should further be understood that the permissive C signal could serve a different function such as to set a third additive rate by appropriate modification of the controller software instructions.

After the shot count has been set to 0 at step 227 (no permissive C input), program flow proceeds to step 229 where a fuel flow reference value or register is set to the value of the fuel flow counter. The controller then checks at step 230 to see if the fuel counter is being incremented. If the fuel counter is not being incremented, a check is made at step 231 to see if the fuel flow switch 29 [FIG. 1] has been activated by flow through the fuel line. If the fuel flow switch has been activated, this would mean that fuel is flowing in the fuel line but the controller would not know at what rate because the fuel counter is not being incremented. This represents a critical failure condition upon which a critical alarm flag is set in system memory at step 232. The controller then performs at step 233 an appropriate abort routine which may issue appropriate alarm signals and inhibit further fuel and additive operations.

If the fuel flow switch has not been activated at step 231 thereby confirming that fuel is not yet flowing through the fuel line, the controller checks to see if the watchdog timer has timed out at step 234. If the watchdog timer has timed out meaning that flow has not commenced within the allocated time, the controller then sets at step 235 a low level alarm flag in system memory. Then an error message is displayed on the controller display at step 236, after which program flow proceeds to the idle return at step 237 in FIG. 5.

If the watchdog timer has not expired at step 234, a check is made at step 238 to see if a permissive A or B signal is still being received. If the permissive A or B signal is no longer being received, the additive injection subroutine is to be terminated. In this event, the controller ensures that the additive flow control valves are closed at step 239 and the fuel and additive totals are updated in the system's memory at step 240, and then program flow passes to the idle return at step 237 in FIG. 5.

Normally the permissive A or B signal will continue to be received until fuel flow commences. Accordingly, program flow will normally loop back to step 230 to again check to see if fuel flow has started. If not, program flow will continue to loop through steps 231, 234 and 238 until either fuel flow switch activation is detected at step 231, the watchdog timer has expired at step 234, a permissive A or B signal is no longer detected at step 238 or the fuel counter starts to increment. Normally the latter will occur first upon start up of fuel flow, at which time program flow moves on to step 243. At step 243, the watchdog timer is reset. Program flow then moves to step 244 at which a check is made to verify that the fuel flow switch is activated. If the fluid flow switch is not activated, program flow branches off to step 245 to set a low level alarm flag in system memory. This would alert the system operator to check the fluid flow switch for a malfunction as the fluid flow switch should always be on whenever there is flow in the main fuel flow line.

Program flow continues at step 248 where a comparison is made between the fuel counter value and the fuel flow reference value to see if the amount of fuel that has flowed through the fuel line has reached the prescribed volume at which additive is to be injected, such as 40 gallons (151.4 liters) of fuel when the selected dose amount, such as 100 cc of additive, is to be injected into the fuel stream for every 40 gallons (151.4 liters) of gasoline. If the fuel counter has not yet reached the inject initiate level, flow loops back to step 230. If the fuel counter has reached and exceeds the inject initiate level, program flow moves to step 250 in FIG. 7 to initiate an inject cycle.

Figure 7:
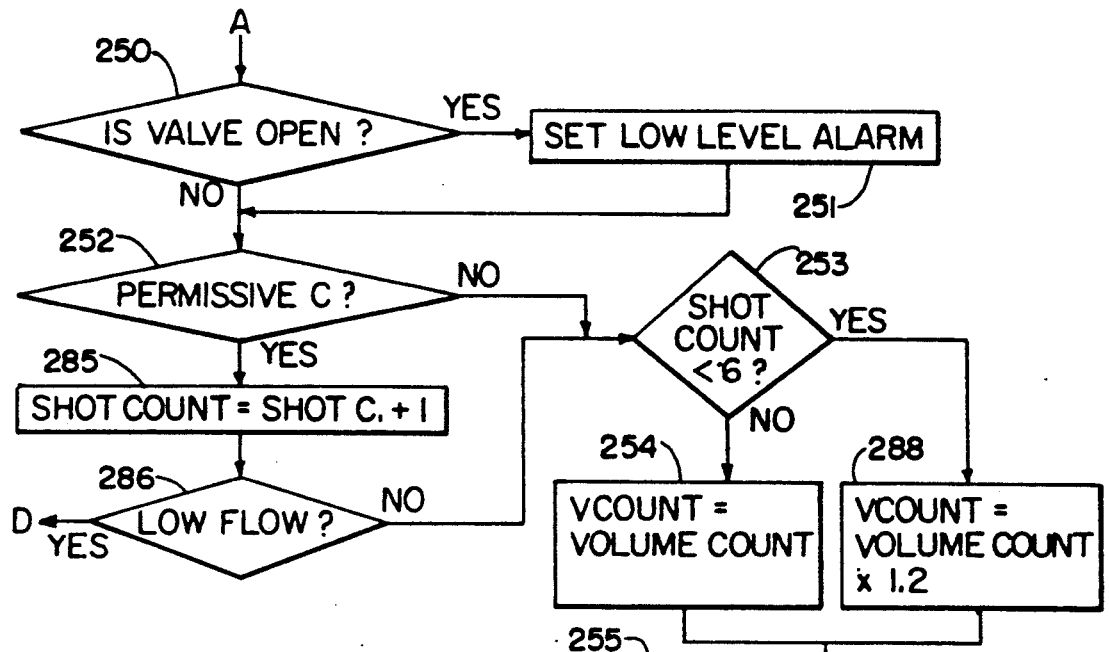

With reference to FIG. 7, a check is made at step 250 to see if the first stage valve is open. If the first stage valve is found to be open, a low level alarm flag is set in memory at step 251. This could occur, for example, if the prior inject cycle had not been completed by the time a new inject cycle was to commence. This may be caused by conditions that reduce the additive flow to a rate insufficient to complete injection of an additive dose in the time that the prescribed volume of fuel has passed for a next inject cycle to start.

Program flow next proceeds to step 252 where a check is made to see if a permissive C input has been received. Assuming for now that a permissive C input has not been received, the controller moves to step 253 where a check is made to see if the shot count is less than 6. In the absence of a permissive C signal, the shot count would have been set to 6 at step 228 in FIG. 6, in which case program flow moves to step 254 where the value of a variable VCOUNT is set to equal the dose value that was set in step 223 or step 224. The controller then moves to step 255 at which an additive reference value is incremented by the value of VCOUNT. Program flow then proceeds to step 256 at which both of the first stage and second stage valves are opened to start injection of additive into the main stream.

Figure 8:
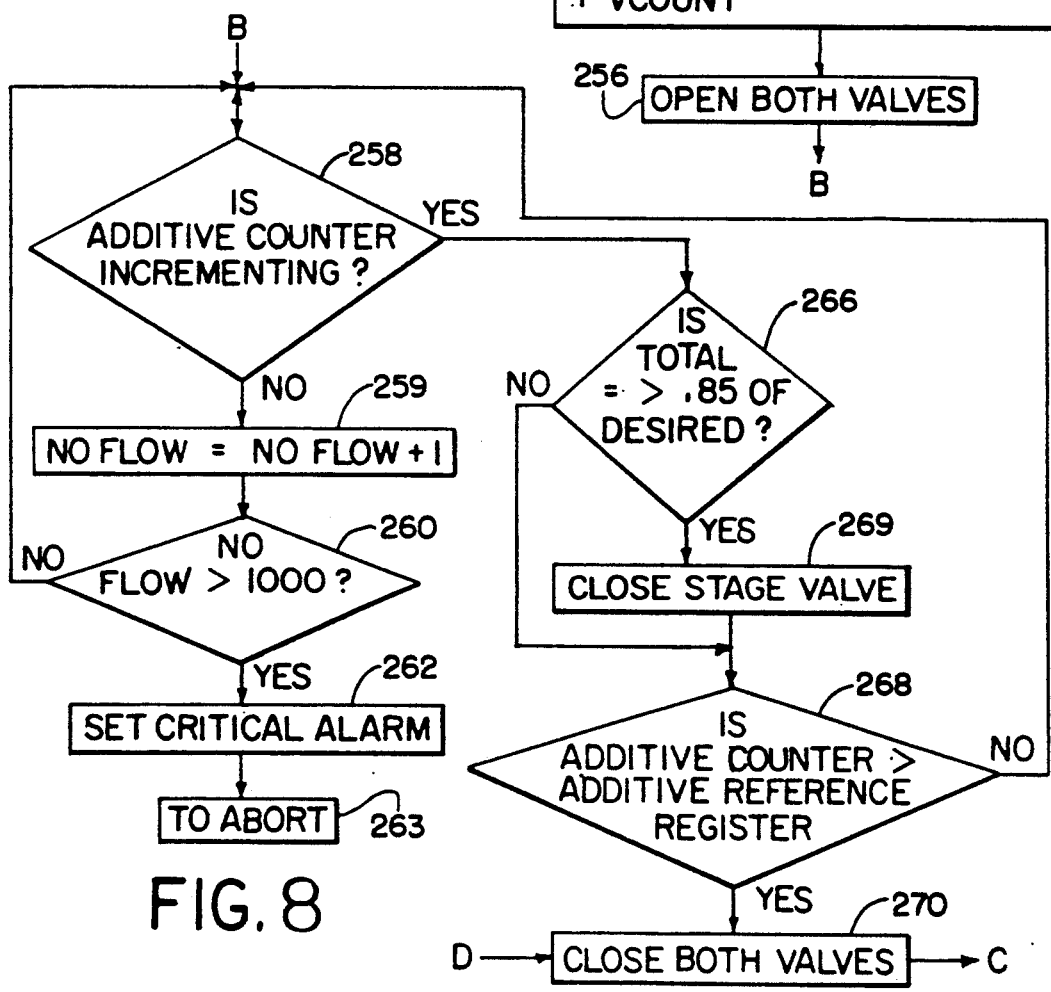

Continuing at step 258 in FIG. 8, the controller looks to see if the additive counter is being incremented which would mean that additive has started to flow through the flow meter. Since some delay may occur between the time that the controller issues a signal to open the inject valves and the time that flow through the meter is detected, there is provided a wait loop including steps 259 and 260. The wait loop is set to allow sufficient time for additive flow to commence, such as about one half second. If additive flow is not commenced within the prescribed amount of time indicating a possible failure condition, a critical alarm is set at step 262 and then an appropriate abort routine is initiated at step 263. However, the additive counter will normally start to be incremented as a result of additive flow prior to timing out of the wait loop, in which case the controller proceeds to step 266.

At step 266, the controller checks to see if the total amount of additive that has been injected is equal or greater than a specified percentage of the total additive dose such as, for example, 85%. If the specified percentage of the additive dose has not yet been injected into the fuel line, the controller proceeds directly to step 268. However, if the specified percentage of total dose has been reached, program flow moves to step 269 whereat the controller effects closing of the second stage valve. Although the second stage valve is closed, additive will continue to flow through the first stage valve but at slower, more controllable rate. In this manner the controller has the ability to provide a two-stage shut down for the additive stream which provides a much greater degree of accuracy in additive flow control then is possible with a standard, single stage injector. Additional stages may be provided in similar manner. For example, a third stage valve having a capacity between the capacities of the first and second stage valves may be initially opened with the first and second stage valves and then closed upon injection of say 95% of the total additive dose.

Continuing now with step 268, a check is made to see if the additive counter has exceeded the additive reference value or register. If not, which means that injection of a full dose has not yet been completed, program flow loops back to step 258. However, upon the additive counter reaching the additive reference value, program flow proceeds to step 270 whereat the controller effects closure of both the first stage and second stage valves to shut off additive flow. The second stage valve usually will have been already shut off at step 270. However, different values of the percentage at which the second stage is to shut down may be set in the hereinafter described manner. If two-stage shut down is not desired, the value for the second stage closure may be set at greater than 100% thereby effectively bypassing step 269 whereupon the first and second stage valves will simultaneously close at step 270.

After step 270, program flow returns to step 229 whereat the fuel flow reference register is increased by an amount corresponding to the prescribed amount of fuel that must flow before the next injection cycle is initiated. Hence, in the illustrated embodiment, the fuel flow reference value is increased by an amount corresponding to 40 gallons (151.4 liters) of fuel or, more particularly by 40 units if the fuel counter is being incremented by 1 unit per gallon. Program flow then moves to step 229 and continues as aforedescribed to effect cyclical injection of additive into the fuel flowing through the fuel line.

Upon completion of the full load of fuel when the main fuel valve 24 is closed by the main system controller 25 [FIG. 1], the fuel counter no longer will be incremented in which event program flow ultimately moves from step 230 to step 231. At step 231, a check is made to see if the fuel flow switch is still activated by flow through the main fuel line. If the fuel switch is still activated indicating that flow has not stopped, program flow moves to step 232 whereat a critical alarm flag is set in memory. Program flow then proceeds to step 233 whereat an appropriate abort routine is initiated.

If the fuel flow switch check at step 231 confirms that there is no fuel flow, the controller proceeds to step 234 where a check is made to see if the watchdog timer has expired. The watchdog timer normally will not have expired at this point, in which case a check is made at 238 to see if a permissive A or permissive B signal is still being received. At the completion of a load, the terminal system controller will no longer be issuing a permissive signal, in which case program flow proceeds to step 239 whereat the controller ensures that the additive flow control valves are closed. The controller then updates the additive and fuel totals in memory at step 240 after which program flow passes to the idle return at 237 in FIG. 5.

The inject subroutine has thus far been described as if a permissive C signal had not been received by the controller. If, however, a permissive C signal is detected at step 225, the shot count is set to equal zero at step 227 before program flow proceeds to step 229. Program flow will then proceed as above described until step 252 [FIG. 7].

When program flow reaches step 252 for the first time after the first prescribed increment of fuel flow has passed through the fuel line and determined at step 248, the presence of a permissive C signal at step 252 causes program flow to branch to step 285 whereat the shot count is incremented by 1 unit. Program flow then proceeds to step 286 to check to see if the low fuel flow control signal has been received from the main system controller at input terminals 171 [FIG. 3]. Until the low fuel flow control signal is received, program flow moves to step 253 where a check is made to see if the shot count is less than 6. As the shot count was initially set to zero at step 227 and has for the first time been incremented by one at step 285, the shot count will be less than 6 whereupon the controller moves to step 288. At step 288, the amount of additive to be injected during the first cycle is increased by a prescribed percentage. In the illustrated embodiment, the amount of additive injected during the first 5 injection cycles is increased by 20% of the selected dose amount, thereby to compensate for the last injection cycle that would normally occur but which is inhibited because of the "clean line" feature selected by receipt of the permissive C signal. After the fifth cycle, the shot count will have been incremented to the value 6 at step 285 in which event the amount of additive injected during each remaining cycle will be the selected dose amount as determined by the permissive A signal or permissive B signal inputs.

At the end of the load, the last inject cycle will be inhibited at step 286 upon detection of the low flow command signal which is issued by the main system controller when only a predetermined, relatively small amount of fuel remains to be dispersed, such as about 50 gallons (151.4 liters). If a low fuel flow command signal is detected at 286, program flow moves to step 270 in FIG. 8 whereat the controller ensures that the first and second stage control valves are closed after which program flow returns to step 229 in FIG. 6. Accordingly, no additive will be injected into the fuel line after receipt of the low fuel flow command signal which, as above indicated, is issued by the main system controller when only a small quantity of fuel remains to be dispersed. As will be appreciated, the last several injection cycles may be inhibited as may be needed to flush the fuel line or which may occur between the time of receipt of the low fuel flow command signal and the end of the load.

Figure 9:
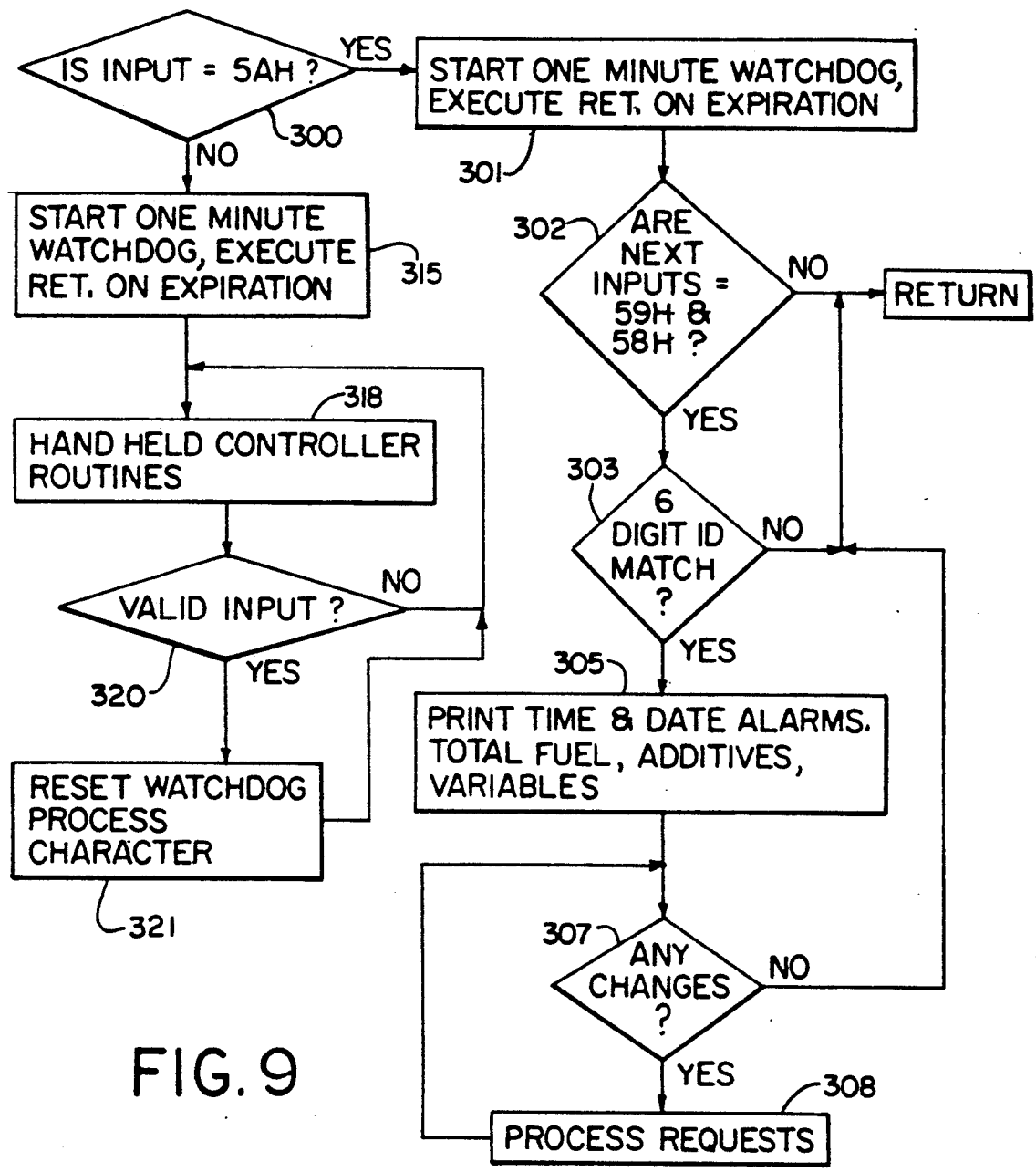

Referring now to FIG. 9, the communication subroutine (called at step 210 in FIG. 5) can be seen to start at step 300 where a check is made to see if an initial code is received, in this case a hexadecimal value "5A" corresponding to the ASCII code for a capitol "Z". This device identifier code is used to determine whether the communication data is originating from the hand held remote transmitter 156 or via the hard wire link established by the serial data receiver 162, as the hand held remote transmitter 156 typically will not be provided with the same level of command and program input as a remotely located terminal communicating via the RS-232 receiver 162.

If the identifier code identifying a remote terminal as the communications source is received at step 300, a watchdog timer is started at step 301. If no additional data is received from the remote terminal before the watchdog timer expires, program flow returns to the main routine in FIG. 5 at the idle return 237. If additional data is received before the timer expires, a check is made at step 302 to see if the next inputs correspond to alert codes confirming that a remote terminal is attempting to establish communications with the additive injection controller. If the correct input codes are not received, the program flow returns to the main program routine at return 237. If the correct inputs are received, in this case the hexadecimal values corresponding to the ASCII codes for the capitol letters "Y" and "X", the injection additive controller waits for receipt of an access code unique to the controller at step 303. If the correct access code is received, the controller moves to step 305. Otherwise, program flow returns to the main program routine at return 237.

The foregoing communications protocol allows a remote terminal to access a plurality of additive injection controllers that have been networked. The initial codes when sent across the network essentially tell the controllers to wake up and wait for receipt of the access code. When the access code is sent, only the thusly designated controller will continue to respond whereas the other controllers will return to their idle state.

Continuing at step 305, the controller transmits according to a predetermined protocol data that has been stored in the controller's memory, including time of date of the report, any alarms that have occurred (type, time and date), total fuel and additive, and controller variables as may be desired. After the data has been reported, the controller prompts the remote terminal for any changes at step 307. If the operator of the remote terminal answers no changes are desired, program flow returns to the main program routine at idle return 237.

If the operator answers that changes are desired, program flow moves to step 308 whereat various process requests may be made by the remote terminal operator and responded to by the controller. The process requests may include, for example, resetting or changing any of the stored values in the controller's memory including the additive dose values, total additive injected, total fuel dispensed, the percentage value at which the second stage additive control valve closes, the incremental fuel flow value, calibration factors, etc. Also, the system optionally may be configured to allow the operator of the remote terminal to make desired changes in the programming of the controller for carrying out different logic sequences as may be desired, although the ability to make these changes should normally be restricted as through use of a user access code to prevent unauthorized modification of the controller's programming. After each process request, the controller returns to step 307 and again prompts the operator of the remote terminal for any additional changes, until no further change is requested after which program flow returns to the main program routine at idle return 237 in FIG. 5.

Returning now to step 300, if the controller does not receive the input code identifying a remote terminal, program flow proceeds to step 315 whereat a watchdog timer is started. If no additional data is received from the hand-held controller before the watchdog timer expires, program flow returns to the main program routine in FIG. 5 at the idle return 237. If additional data is received, the controller moves to step 318 to see if the received data corresponds to any one of a predetermined set of codes identifying respective hand held controller routines. As above indicated, the hand held remote transmitter may generate upon depressing a selected key a single character sequence identifying a specific controller routine. Preferably, the keys (or an equivalent input device) on the transmitter are appropriately labeled to facilitate operator selection of a desired function or for imputing data when prompted by the controller, such as by a prompt displayed on the controller display 153 [FIG. 3]. Accordingly, an operator may select a desired routine and, as needed, input data such as volume amounts, meter factors, etc. The keypad inputs and transmitted codes may be tailored to any given application of the subject invention by those skilled in the art using conventional practices.

If a valid data input (character) has been received at step 318, the corresponding routine is called and run. After the routine is completed, the controller moves to step 320. The controller also moves to step 320 even if an invalid data input has been received by the controller.

At step 320, a check is made to see if the data input was a valid input. If not, program flow loops back to step 318 for receipt of a next data input. If a valid input had been received, the controller moves to step 321 whereat the watchdog timer is reset and the character is processed, as may be needed, for example, to select a routine that is identified by a two character sequence. After step 321, program flow returns to step 318 for receipt of a next character input from the remote transmitter.

The hand held controller routines for the subject application of the invention may include a routine for testing the controller, routines for setting the additive doses for permissives A and B, a routine for setting the additive meter factor, a routine for resetting the controller in total or specific items such as the alarms, a routine for displaying the controller access code, etc.

The test routine may include selection of an amount of additive to be dispersed as through the test valve into a calibration gauge. More particularly, the hand held transmitter may be used to select the permissive A or permissive B dose amount for the test, after which a test button on the transmitter is depressed to run an inject cycle. This may be done for several times to obtain an average of the amount of additive injected per cycle. If the additive meter factor requires correction, then a meter factor change routine could be run under the control of the hand held transmitter, whereby the meter factor stored in the controller's memory may be corrected.

Conventional programming techniques may be used by those skilled in the art to implement any one or more of these and other routines that may be desired in a particular application of the present invention. Although the programming and functions of the hand held routines may be varied as desired, an important aspect of the present invention is that the routines are initiated and controlled by the hand held remote transmitter by transmission of electromagnetic energy through a window in the controller housing and the decoding of information included in the electromagnetic energy for carrying out one or more functions based on such information.

Although not shown in FIG. 9, provision may be made in the programming to check for receipt from the hand held transmitter of the controller's access code before responding to further inputs received from the transmitter. This will prevent the transmitter from activating other controllers (having different access codes) that may be located in the vicinity of the controller to be activated. Also, the same transmitter may be used to control multiple controllers, as may be desired.

Although the invention has been shown and described with respect to a preferred embodiment, it will be apparent that equivalent alterations and modifications will occur to others skilled in the art upon the reading and understanding of this specification. The present invention includes all such equivalent alterations and modifications, and is limited only by the scope of the following claims.

What is claimed is:

1. An additive injector system for injecting a controlled amount of a first fluid into a main stream of a second fluid, comprising:
   an explosion-proof housing having a window through which can be transmitted electromagnetic energy encoded with information;
   a first fluid flow line for passage of said first fluid to a flow passage for said second fluid;
   a valve for controlling the flow of said first fluid through said first fluid flow line; and
   electronic means for controlling said system, said electronic means being contained within said housing and comprising:
      receiver means for receiving the information encoded electromagnetic energy when transmitted through said window;
      signal processing means for decoding information included in said electromagnetic energy; and
      control means for carrying out at least one predetermined function based on the decoded information.

2. The system of claim 1, further comprising remote transmitter means for transmitting said electromagnetic energy.

3. The system of claim 2, wherein said electromagnetic energy comprises an infrared signal.

4. The system of claim 1, wherein said at least one predetermined function comprises controlling an operation characteristic of said electronic means.

5. The system of claim 4, wherein said operation characteristic is a duty cycle of said valve.

6. The system of claim 1, wherein said at least one predetermined function comprises effecting a system reset.

7. The system of claim 1, wherein said at least one predetermined function comprises calibrating at least a portion of said system.

8. A system for controlling an amount of a first fluid which is injected into a main stream of a second fluid, comprising:
   a base unit and remote transmitter means for transmitting information encoded electromagnetic energy to said base unit; said base unit including:
      means for receiving a first electrical signal representative of said amount of said first fluid injected into said second fluid,
      means for receiving a second electrical signal representative of an amount of said second fluid into which said first fluid is injected,
      means for providing a control signal based on said first and second electrical signals for use in regulating said amount of said first fluid,
      receiver means for receiving the information encoded electromagnetic energy transmitted to said base unit by said remote transmitting means,
      signal processing means for decoding information represented in said electromagnetic energy, and
      control means for carrying out at least one predetermined function based on the decoded information.

9. The system of claim 8, wherein said first and second electrical signals comprise, respectively, first and second periodic signals having frequencies which are proportional to the amounts of said first and second fluids, respectively.

10. The system of claim 9, wherein for every M cycles occurring in said second periodic signal, said control signal causes said first fluid to be injected such that N cycles are produced in said first periodic signal.

11. The system of claim 10, wherein said at least one predetermined function comprises preselecting at least one of the values of M and N.

12. The system of claim 11, further comprising counting means for counting said M and N cycles, and wherein sad at least one predetermined function comprises resetting said counting means.

13. The system of claim 10, wherein for every M cycles which occur in said second periodic signal up to a total of T cycles, said control signal causes said first fluid to be injected such that N cycles are produced in said first periodic signal.

14. The system of claim 13, further comprising counting means for counting sad M, N and T cycles, and wherein said at least one predetermined function comprises preselecting the value of at least one of M, N and T.

15. An additive injection system for blending a controlled amount of a first fluid into a main stream of a second fluid, comprising:
   an additive flow line for flow of the first fluid from a source thereof to a main flow line for the second fluid;
   at least one valve for controlling the flow of the first fluid through said first line;
   inject control means for controlling opening and closing of said valve for cyclical injection of a prescribed incremental amount of the first fluid; and
   a flow meter connected to said additive flow line for providing to said inject control means periodic signals representative of the amount of flow of the first fluid through said additive flow line;
   said inject control means including an additive amount counter which is incremented in response to the periodic signals received from said flow meter, and a reference counter; and
   wherein said inject control means includes means to (a) open said valve to begin flow through said additive flow line upon initiation of a first inject cycle, (b) close said valve when the valve of the additive amount counter reaches a predetermined relationship with the value of the reference counter, the reference counter initially being set to a value corresponding to the prescribed incremental amount, (c) increment the reference counter by the value corresponding to the prescribed incremental amount, (d) open said valve to allow flow through said additive flow line upon initiation of a next inject cycle, (e) close said valve when the value of the additive amount counter reaches a predetermined relationship with the value of the reference counter, and (f) repeat steps (c)-(e) until initiation of a last inject cycle and the valve is closed upon the additive amount counter reaching the predetermined relationship with the value of the reference counter.

16. A method of blending a fuel additive into a main stream of fuel, wherein prescribed doses of additive are cyclically injected into the main stream of fuel, comprising the steps of
   allowing flow of additive through first and second flow lines from a supply thereof to the main stream of fuel upon initiation of an inject cycle;
   measuring the amount of additive flowing into the main stream of fuel;
   stopping flow of additive through the first flow line when the amount of additive injected into the main stream of fuel reaches a predetermined relationship to the prescribed dose of additive, while allowing additive to continue to flow through the second flow line; and
   stopping flow of additive through the second flow line when the amount of additive injected into the main stream of fuel reaches a second predetermined relationship to the prescribed dose of additive.

17. An additive injection system for blending a controlled amount of a first fluid into a mainstream of a second fluid, comprising:
   a controller housing;
   electrical circuitry for controlling said system, said electrical circuitry being contained within said housing; and
   a flow meter including a drive magnet, a meter housing including a flow chamber through which additive flows, means operated by flow of additive through said flow chamber for rotating said drive magnet at a speed proportional to the rate of additive flow, a driven magnet magnetically coupled to said drive magnet through a wall of said meter housing, said wall forming a fluid isolation barrier between the coupled magnets, a rotatable shaft extending through a wall of said controller housing, said driven magnet being mounted to an outer end of said shaft, and an indicator mounted to the inner end of said shaft within said controller housing for rotation with said shaft; and
   wherein said electrical circuitry contained within said housing includes means responsive to rotation of said indicator.

18. An apparatus for blending a controlled amount of a first fluid into a mainstream of a second fluid flowing in a main flow line through which a quantity T of the second fluid is dispensed during a dispensing operation, comprising
    means for cyclically injecting a quantity D of the first fluid into the main flow line for each quantity E of the second fluid flowing through the main flow line,
    means for inhibiting N injection cycles at the end of the dispensing operation, whereby a quantity of N times E of the second fluid flowing through the main flow line at the end of the dispensing operation will not have any of the first fluid blended therein, and
    wherein said means for cyclically injecting includes means for injecting during M number of injection cycles the quantity D plus an additional amount, the additional amounts when totaled over said M number of injection cycles equaling the volume N times D, thereby to make up for the quantity of the first fluid not injected during the last N injection cycles, and wherein N and M are greater than 0.

19. A method for blending a controlled amount of a first fluid into a mainstream of a second fluid flowing in a main flow line through which a quantity of the second fluid is dispensed during a dispensing operation, comprising the steps of:
    dispensing a quantity T of the second fluid through the main flow line,
    cyclically injecting a quantity D of the first fluid into the main flow line for each quantity E of the second fluid flowing through the main flow line,
    inhibiting N injection cycles at the end of the dispensing operation, whereby a quantity of N times E of the second fluid flowing through the main flow line at the end of the dispensing operation will not have any of the first fluid blended therein, and
    wherein during M number of the injection cycles the amount of additive injected equals the quantity D plus an additional amount, the additional amounts injected over said M number of injection cycles totaling an amount equal N times D, thereby to make up for the quantity of first fluid not injected during the last N injection cycles, and wherein N and M are greater than 0.

20. A method as set forth in claim 19, wherein the amount of additional additive injected during said M number of injection cycles equals N times D divided by M, and M is greater than 1.

21. An additive injection system as set forth in claim 15, comprising means for receiving cycle control signals related to the rate of flow of the second fluid through the main flow line, and means responsive to said cycle control signals for initiating said first and subsequent inject cycles.

22. An additive injection system as set forth in claim 21, wherein said steps (c)–(e) are repeated until the reference counter is incremented to a value corresponding to a predetermined amount of the first fluid to be blended into a given amount of the second fluid.

23. A method of blending a controlled amount of a first fluid into a main stream of a second fluid via an additive flow line connected to a main flow line for the second fluid, the additive flow line having connected thereto a flow meter for providing periodic signals representative of the amount of flow of the first fluid through the additive supply line, comprising the steps of:
    (a) initially setting a reference counter to a value corresponding to a prescribed incremental amount of the first fluid to be cyclically injected into the main stream of the second fluid,
    (b) opening a valve to begin flow through the additive flow line upon flow of a prescribed amount of the second fluid through the main flow line,
    (c) incrementing an additive amount counter in response to the periodic signals received from the flow meter,
    (d) closing the valve when the value of the additive amount counter reaches a predetermined relationship with the value of the reference counter,
    (e) incrementing the reference counter by the value corresponding to the prescribed incremental amount,
    (f) opening the valve to allow flow through the additive flow line upon further flow of a prescribed amount of the second fluid through the main flow line,
    (g) closing the valve when the value of the additive amount counter reaches a predetermined relationship with the incremented value of the reference counter, and
    (h) repeating steps (c)–(e) until the reference counter is incremented to a final value corresponding to a total amount of the first fluid to be injected for a given quantity of the second fluid and the valve is closed upon the additive amount counter reaching the predetermined relationship with the last incremented value of the reference counter.

* * * * *